(12) United States Patent
Bao et al.

(10) Patent No.: US 12,481,571 B2
(45) Date of Patent: *Nov. 25, 2025

(54) CONTRIBUTION INCREMENTALITY MACHINE LEARNING MODELS

(71) Applicant: Google LLC, Mountain View, CA (US)

(72) Inventors: Xinlong Bao, Los Altos, CA (US); Ali Nasiri Amini, Redwood City, CA (US); Jing Wang, Mountain View, CA (US); Mert Dikmen, Belmont, CA (US); Amy Richardson, Santa Cruz, CA (US); Dinah Shender, Sunnyvale, CA (US); Junji Takagi, Sunnyvale, CA (US); Sen Li, Mountain View, CA (US); Ruoyi Jiang, Sunnyvale, CA (US); Yang Jiao, San Mateo, CA (US); Yang Zhang, Sunnyvale, CA (US); Zhuo Zhang, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,830

(22) Filed: Apr. 3, 2024

(65) Prior Publication Data

US 2024/0248825 A1     Jul. 25, 2024

Related U.S. Application Data

(63) Continuation of application No. 17/278,395, filed as application No. PCT/US2019/064752 on Dec. 5, 2019, now Pat. No. 11,983,089.

(51) Int. Cl.
G06F 11/34        (2006.01)
G06N 20/00       (2019.01)

(52) U.S. Cl.
CPC ...... *G06F 11/3433* (2013.01); *G06F 11/3428* (2013.01); *G06N 20/00* (2019.01)

(58) Field of Classification Search
CPC ............ G06Q 30/0201; G06Q 30/0202; G06F 11/3433; G06F 11/3428
See application file for complete search history.

(56) References Cited

U.S. PATENT DOCUMENTS 10,387,909 B2    8/2019  Yadagiri et al.
2013/0018719 A1  1/2013  Abraham et al.
(Continued)

FOREIGN PATENT DOCUMENTS

CN       110140133       8/2019
KR    10-2016-0116050    10/2016
WO     WO 2013010114     1/2013

OTHER PUBLICATIONS

International Preliminary Report on Patentability in International Appln. No. PCT/US2019/064752, mailed on Jun. 16, 2022, 7 pages.
(Continued)

*Primary Examiner* — Lam S Nguyen
(74) *Attorney, Agent, or Firm* — Fish & Richardson P.C.

(57) ABSTRACT

Methods, systems, and computer programs encoded on a computer storage medium, for training and using machine learning models are disclosed. Methods include creating a model that represents relationships between user attributes, content exposures, and performance levels for a target action using organic exposure data specifying one or more organic exposures experienced by a particular user over a specified time prior to performance of a target action by the particular user and third party exposure data specifying third party exposures of a specified type of digital component to the particular user over the specified time period. Using the model, an incremental performance level attributable to each of the third party exposures at an action time when the target
(Continued)

action was performed by the particular user is determined. Transmission criteria for at least some digital components to which the particular user was exposed are modified based on the incremental performance.

20 Claims, 9 Drawing Sheets

(56) References Cited

U.S. PATENT DOCUMENTS

2016/0247180 A1  8/2016 Bhogal et al.
2018/0302472 A1  10/2018 Zhao et al.
2019/0068733 A1  2/2019 Lewis et al.

OTHER PUBLICATIONS

International Search Report and Written Opinion in International Appln. No. PCT/US2019/064752, mailed on Feb. 12, 2020, 12 pages.
Notice of Allowance in Japanese Appln. No. 2021-505921, mailed on Jan. 10, 2023, 5 pages (with English translation).
Notice of Allowance in Korean Appln. No. 10-2021-7001625, mailed on Jun. 21, 2023, 4 pages (with English translation).
Office Action in Chinese Appln. No. 201980053188.7, mailed on May 31, 2024, 14 pages (with English translation).
Office Action in Japanese Appln. No. 2021-505921, mailed on Jun. 6, 2022, 10 pages (with English translation).
Office Action in Korean Appln. No. 10-2021-7001625, mailed on Dec. 16, 2022, 10 pages (with English translation).

CONTRIBUTION INCREMENTALITY MACHINE LEARNING MODELS

CROSS-REFERENCE TO RELATED APPLICATION

This application is a continuation application and claims priority under 35 U.S.C. § 120 to U.S. patent application Ser. No. 17/278,395, filed on Mar. 22, 2021, which is a national stage application under 35 U.S.C. § 371 of International Application No. PCT/US2019/064752, filed Dec. 5, 2019. The disclosure of each of the foregoing applications are hereby incorporated by reference in their entirety.

BACKGROUND

This specification relates to data processing and machine learning models.

Users engage in various online activities, and each of these activities results in the users being exposed to different information. Subsequent online activity by a user can be influenced by their previous activity and the information to which they were exposed. However, the amount of influence of each previous activity on subsequent activity is difficult to evaluate.

SUMMARY

In general, one innovative aspect of the subject matter described in this specification can be embodied in methods including the operations of creating a model that represents relationships between user attributes, content exposures, and performance levels for a specified target action; obtaining organic exposure data specifying one or more organic exposures experienced by a particular user over a specified time prior to performance of a specified target action by the particular user, wherein the organic exposures are neither exposures to a specified type of digital component nor performance of the specified target action; obtaining third party exposure data specifying third party exposures of the specified type of digital component to the particular user over the specified time period, wherein the third party exposure data includes, for each of the third party exposures, an exposure time specifying when the third party exposure occurred; determining, using the model, an incremental performance level attributable to each of the third party exposures at an action time when the specified target action was performed by the particular user; and modifying, transmission criteria for at least some digital components to which the particular user was exposed based on the incremental performance level that is attributed to the third party exposures of the at least some of the digital components. Other embodiments of this aspect include corresponding methods, apparatus, and computer programs, configured to perform the actions of the methods, encoded on computer storage devices. These and other embodiments can each optionally include one or more of the following features.

Methods can include performing ablation experiments to obtain a set of control outcomes for a set of control users that are not exposed to a particular set of digital components, the control outcomes specifying, for each particular control user in the set of control users, whether the particular control user performed the specified action; and collecting exposure outcomes for a set of exposed users that are not included in the set of control users, the exposure outcomes specifying, for each exposure user in the set of exposure users, whether the exposure user performed the specified action.

Methods can include creating the model by creating, using a machine learning framework, the model using user attributes, the control outcome for each particular control user, and the exposure outcome for each exposure user.

The methods may further include determining the incremental performance level attributable to each of the third party exposures, comprising: for each third party exposure, determining a difference between the exposure time of the third party exposure and the action time when the specified target action occurred; determining, based on the difference between the exposure time of the third party exposure and the action time when the specified target action occurred, a residual amount of performance level contribution from the third party exposure that remains at the action time; and attributing the residual amount of the performance level to the third party exposure.

Methods can include determining, for each different type of third party exposure, a decay function specifying a rate of decay of the performance level contribution remaining as a function of time; and determining for each third party exposure, the residual amount of performance level contribution from the third party exposure that remains at the action time based on the decay function and the difference between the exposure time of the third party exposure and the action time.

Methods can include modifying transmission criteria for at least some digital components comprises adjusting the transmission criteria for a particular digital component in proportion to a magnitude of the incremental performance level attributed to third party exposures of the particular digital component;

Methods can include adjusting the transmission criteria includes disabling a particular transmission criterion having less than a specified magnitude of the incremental performance level attributed to the third party exposures of the particular transmission Particular embodiments of the subject matter described in this specification can be implemented so as to realize one or more of the following advantages. Machine learning models can be trained to delineate between the remaining effects of various events on an outcome at any point in time following occurrence of the various events. A quantification of the remaining effects of each prior event at the time of the outcome can represent a portion of the outcome that is attributable to each prior event. This quantification of the remaining effects enables direct comparison as to the effect of each event on the ultimate outcome even though the events may occur at different times. The models discussed herein can quantify the incremental effect of each event (e.g., content exposure) relative to a baseline tendency of a user to arrive at a target outcome. The data collection described herein is performed in a manner such that the machine learning models can be trained to characterize the intrinsic likelihood that a user will arrive at the target outcome, and also be trained to quantify the initial effect of an event on the user's intrinsic likelihood, as well as the change in the initial effect over time following the event. Transmission criteria for digital components can be modified based on the output of the machine learning models, so as to modify when, or how, the digital components are transmitted over a network.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
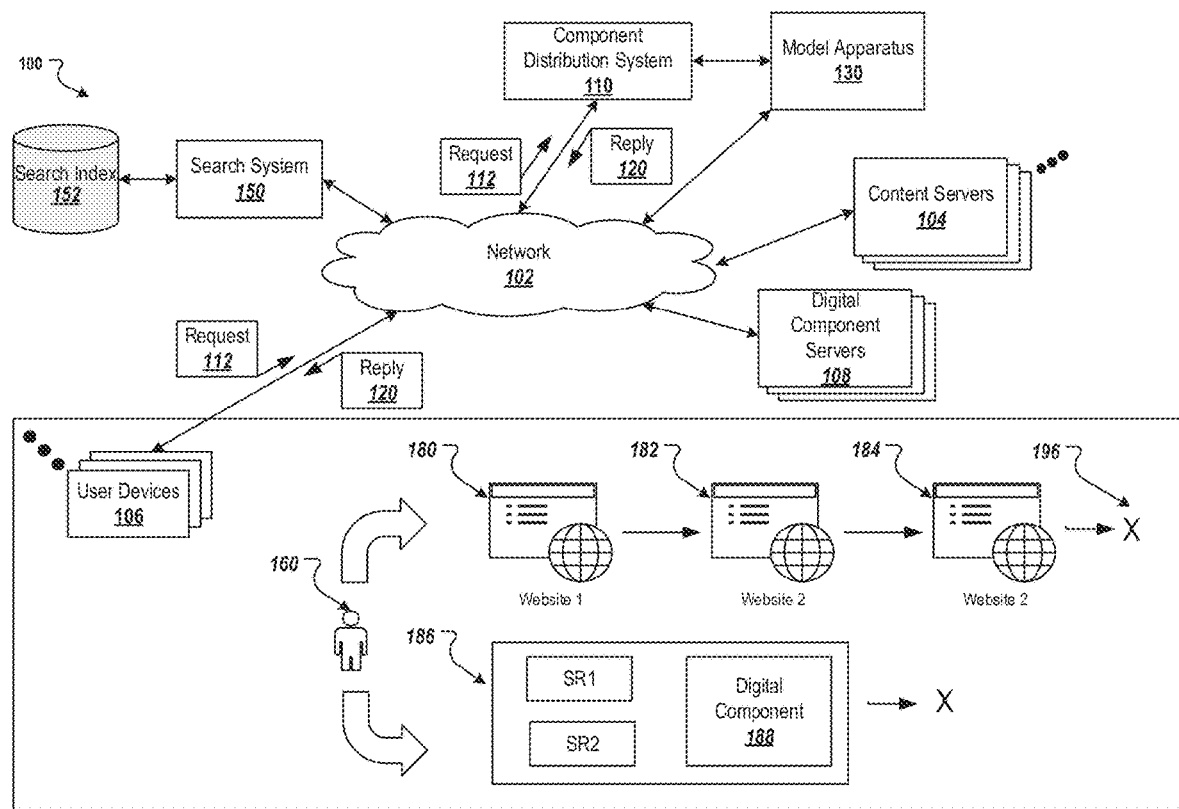
FIG. 1 is a block diagram of an example environment in which online content is distributed.

Users connected to the internet are exposed to a variety of digital content (e.g., search results, web pages, digital components, news articles, social media posts, audio information output by a digital assistant device). Some of these exposures to content may contribute to the users performing a specified target action. For example, a user that is exposed to a web page about an endangered species may sign up for a newsletter directed to helping save that endangered species, where signing up for the newsletter can be considered the specified target action. Similarly, a user that is exposed to information about a particular type of mobile device may ultimately acquire that particular type of mobile device, where acquisition of the mobile device may be considered the target action. Examples of target actions can also include registering with a website/service, adding items to an online cart, downloading a whitepaper, or acquiring a product.

It can be difficult to determine how much each exposure of content to a user contributes to a user performing a subsequent target action. For example, assume a user searches for "sports cars", reviews search results returned in response to submission of the search query "sports cars", is exposed to a digital component depicting a particular brand of sports car, and visits various websites that provide information about sports cars. Further assume that the user in this example subsequently submits an online request to obtain information about acquiring the particular brand of sports car. In this example, the amount by which each of those online activities contributed to the user's subsequent submission of a request to obtain information about acquiring the particular brand of sports car is not something that is directly observable, and from the perspective of a third party (i.e., someone other than the user), is difficult to ascertain particularly as the time between the online activities and subsequent user action increases. However, any information about the relative contributions of each online activity and content exposure that can be derived can be used by an online content distribution system to more efficiently and effectively present the user with information that is relevant to the user, and also allows third parties to understand how the content they produce and distribute affect subsequent user actions.

This document discusses techniques for determining the relative contributions of different content exposures to user performance of a specified target action. For example, the techniques discussed in this document create a model that is capable of determining the effect of each exposure to online content as it relates to a user's subsequent performance of a specified target action. Additionally, the techniques discussed in this document enable the system to determine the incremental contribution of each exposure that remained at the time the specified target action was performed.

More specifically, the techniques described in this document determine a baseline performance level for the specified target action that is attributable to a user's organic online activity, and can determine an incremental effect of the user being exposed to digital components injected into online resources by a third party on the user's performance of the target action.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. As used in this document, the phrase digital component refers to a discrete unit of content that differs from organic content exposures, which are referred to as organic events, and discussed in detail below.

FIG. 1 is a block diagram of an example environment 100 in which content is distributed. As described in more detail below, users are exposed to a variety of online content in the environment 100, and the techniques discussed throughout this document can determine the incremental effect of each of those exposures to a user performing a specified target action.

The example environment 100 includes a network 102, such as a local area network (LAN), a wide area network (WAN), the Internet, or a combination thereof. The network 102 connects content servers 104, user devices 106, digital component servers 108, and a digital component distribution system 110 (also referred to as a component distribution system).

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by content servers 104. For example, the content servers 104 can include servers that host publisher websites. In this example, the user device 106 can initiate a request for a given publisher webpage, and the content server 104 that hosts the given publisher webpage can respond to the request by sending machine executable instructions that initiate presentation of the given webpage at the client device 106.

In another example, the content servers 104 can include app servers from which user devices 106 can download apps. In this example, the user device 106 can download files required to install an app at the user device 106, and then execute the downloaded app locally. The app can present organic content, e.g., content specified by a developer of the app, and in some cases can also present one or more digital components (e.g., content created/distributed by a third party) that are obtained from a digital component server 108, and inserted into the app while the app is being executed at the user device 106.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into the given electronic document to create a composite electronic document including the content obtained from the data source.

In some situations, a given electronic document can include a digital component tag or digital component script that references the digital component distribution system 110. In these situations, the digital component tag or digital component script is executed by the client device 106 when the given electronic document is processed by the user device 106. Execution of the digital component tag or digital component script configures the user device 106 to generate a request for digital components 112 (referred to as a "component request"), which is transmitted over the network 102 to the digital component distribution system 110. For example, the digital component tag or digital component script can enable the user device 106 to generate a packetized data request including a header and payload data. The component request 112 can include event data specifying features such as a name (or network location) of a server from which the digital component is being requested, a name (or network location) of the requesting device (e.g., the user device 106), and/or information that the digital component distribution system 110 can use to select one or more digital components provided in response to the request. The component request 112 is transmitted, by the user device 106, over the network 102 (e.g., a telecommunications network) to a server of the digital component distribution system 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital components that are eligible for presentation with the electronic document. The event data can also include a search query that was submitted from the user device 106 to obtain a search results page, and/or data specifying search results and/or textual, audible, or other visual content that is included in the search results.

Component requests 112 can also include event data related to other information, such as information that a user of the user device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The component distribution system 110, which includes one or more digital component distribution servers, chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the user device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

User devices 106 can submit search queries to the search system 150 over the network 102. In response, the search system 150 accesses the search index 152 to identify electronic documents that are relevant to the search query. The search system 150 identifies the electronic documents in the form of search results and returns the search results to the user device 106 in search results page. A search result is data generated by the search system 150 that identifies an electronic document that is responsive (e.g., relevant) to a particular search query, and includes an active link (e.g., hypertext link) that causes a client device to request data from a specified location in response to user interaction with the search result. An example search result can include a web page title, a snippet of text or a portion of an image extracted from the web page, and the URL of the web page.

Another example search result can include a title of a downloadable application, a snippet of text describing the downloadable application, an image depicting a user interface of the downloadable application, and/or a URL to a location from which the application can be downloaded to the user device 106. Another example search result can include a title of streaming media, a snippet of text describing the streaming media, an image depicting contents of the streaming media, and/or a URL to a location from which the streaming media can be downloaded to the client device 106. Like other electronic documents search results pages can include one or more slots in which digital components (e.g., advertisements, video clips, audio clips, images, or other digital components) can be presented. As described above, a variety of online content can be presented to users as they interact with online resources available through the Internet. That online content can generally be classified as organic content or digital components. Organic content is content that is specified by and/or provided by an owner or administrator of the online resource in which the content is being presented. Examples of organic content include search results provided by a search engine, and content presented in a web page provided by a publisher. In each of these examples, the content presented is specified by the entity providing the online resource, and is therefore considered first party content. For example, the search engine identifies online resources relevant to a submitted search query, generates search results identifying those relevant resources, and generates a search results page (in the domain of the search engine) that includes the search results generated by the search engine. Thus, the search results are generated by the search engine, and presented in the search results page generated by the search engine, thereby making the search results first party content, and thus, organic content. Similarly, when a user visits a particular web page, that web page will include content specified by and/or generated by the publisher of that web page, which is also considered first party content, also making it organic content for purposes of the present discussion.

For purposes of this discussion, digital components are considered third party content because the digital components are created by and/or provided by an entity that differs from the entity providing the online resource on which the digital component is presented. In the context of a search results page, a digital component that includes third party content can be a digital component that is selected for inclusion in the online resource at the time the online resource is presented (e.g., weather data, stock data, or advertisements). For example, a digital component (e.g., presenting current weather conditions, stock prices, or advertisements) can be selected by a third party (e.g., a different domain than the search engine domain) at the time a search results page is generated, and provided for presentation within the search results page. As discussed above, digital components presented with a search results page can be selected by an entity other than the entity providing the search results page based, at least in part, on the search query submitted by the user. In the context of a web page provided by a publisher (e.g., a blog, news web page, weather web page, stock information web page), a digital component provided by a third party that differs from the publisher of the web page can be selected for presentation in the web page when the web page is requested by a client device. The digital components selected for presentation with a given web page can be selected, for example, based on organic content of the given web page and/or characteristics of the user (e.g., interests, profile information, etc.) visiting the given web page.

Each exposure to content can have an effect on a user's future online (or offline) activity. For example, a user that sees content related to a particular brand of shoe (e.g., reviews, news articles, or advertisements) may be more likely to acquire that particular brand of shoes than the user would have been absent from the exposures. In some situations, it can be advantageous to be able to quantify the effects of different content exposures as they relate to a user subsequently performing some specified target action.

In some implementations, the target action can be specified by a digital component provider. For example, a digital component provider specify that the target action as one or more of the user downloading a white paper, navigating to at least a given depth of a website, viewing at least a certain number of web pages, spending at least a predetermined amount of time on a website or web page, completing a website registration process, subscribing to a digital service, adding items to shopping cart or purchasing a product. When a user performs a specified target action, performance of the specified target action can be referred to as a conversion.

A user's performance of the specified target action is often preceded by a series of exposures to online content. For example, assume that the user 160 has interest in a particular camera and wants to know more about the camera. Further assume that a digital component provider that distributes digital components containing information about the particular camera has specified the target action as acquisition of the particular camera.

In this example, the user 160 may search for information about the particular camera on the user device 106 by submitting a search query to the search system 150 over the network 102. The search system 150 identifies search results responsive to the search query, and returns the search results to the user device 106 for display, which is considered an exposure of organic content about the particular camera to the user 160 (e.g., assuming that digital components about the particular camera are not presented on the search results page). The user 160 viewing the search results at the user device 106 can visit websites 180, 182, and 184 (e.g., by clicking on several of the search results) which each contain information about the particular camera. Each of these visits to the websites by the user 160 can also be considered exposures of organic content to the user 160. Assuming that the user 160 ultimately acquires the particular camera (i.e., performs the specified target action), each of these exposures to organic content, referred to as organic events, will have contributed to the user's performance of the specified target action, and the relative contribution of these organic exposures can be quantified as described in more detail below.

In the example, above, it is assumed that the user 160 was exposed to organic content about the particular camera prior to performing the specified target action, but that the user 160 was not exposed to a digital component about the particular camera (e.g., a specified type of digital component). Exposures to digital components can also contribute to the user's performance of the specified target action. For example, assume that prior to performing the specified target action, the user 160 performs another search. Further assume that, in response to this search, the search system 150 returns a search results page 186 including search results (e.g., SR1 and SR2), and a digital component server 108 provides a digital component 188 about the particular camera for presentation with the search results.

In this example, when the user 160 subsequently performs the specified target action (e.g., acquiring the particular camera), the user's exposure to the digital component 188 will also have contributed to the performance of that specified target action. However, it is not readily apparent, not directly observable, and difficult to determine the level of the effect of the digital component exposure as it relates to the user's subsequent performance of the specified target action. Moreover, it is not readily apparent from raw data related to content exposures alone how to differentiate between the contributions of organic exposures and the contributions of exposures to digital components as they relate to influencing the user's subsequent performance of the target action. As such, it can be difficult to effectively and efficiently distribute content to users, particularly as it relates to digital components.

To determine the effects of content exposures as they relate to users performing a specified target action, the environment 100 can include a model apparatus 130 that is configured to evaluate content exposures, and determine the level of contribution of each of those content exposures to users' subsequent performance of a specified target action. This information can be used to determine the performance of specified type of digital components distributed by the component distribution system 110, which can be used to improve the relevance of content presented to users, for example, by modifying transmission criteria that control when, where, or how digital components are transmitted for presentation to users.

As described in more detail below, the model apparatus 130 is configured to implement data collection techniques that enable the model apparatus 130 to learn relationships between users' attributes and baseline performance levels of a specified target action (e.g., levels at which users having certain attributes perform the specified target interaction). These relationships can referred to as a baseline action model that can output a baseline performance level based on attributes input to the system. This baseline performance model can be a stand-alone model, or incorporated into a more complex model structure that also takes into account other data, as described in more detail below.

The baseline performance levels represent the level of performance of the specified target action in the absence of users being exposed to digital components of a specified type. For example, a particular baseline performance level can be created to represent a rate at which users acquire a particular type of shoe when those users have not been exposed to digital components distributed for a seller of that particular type of shoe. In a specific example, the baseline performance measure can be indicative of the portion of users having a certain set of attributes that will acquire the particular type of shoe without those users being exposed to advertisements for that particular type of shoe.

The data collection techniques implemented by the model apparatus 130 also enable the model apparatus 130 to model the effects of various content exposures over time as it relates to users subsequently performing the specified target action. For example, the model apparatus 130 can create a model that quantifies an initial change in the portion of users that perform the specified target action immediately following exposure to a particular type of content (e.g., organic content or a digital component), and that represents the decay of that initial change over time (e.g., toward the baseline performance measure), as described in more detail below. This ability to delineate between the baseline performance level and the remaining effects of various content exposures over time enables the model apparatus 130 to determine the incremental effects of each content exposure remaining at the time the specified target action is performed, thereby providing an improved attribution model relative to traditional attribution models that are not able to delineate the relative contributions of each content exposure that remain when the specified target action is performed.

Figure 2:
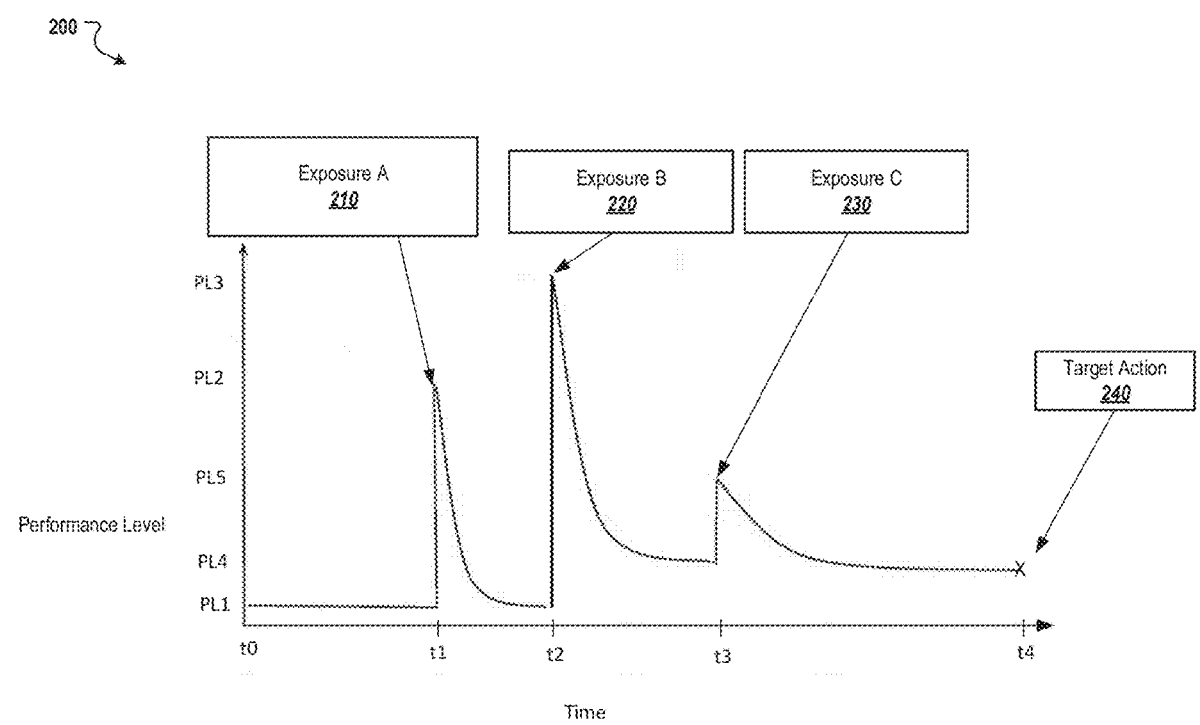
FIG. 2 is a graph illustrating example effects of content exposures on the performance of a target action over time.

FIG. 2 is an example graph 200 illustrating example effects of content exposures digital component on performance of a target action over time. In FIG. 2, at time t0, the performance level is at PL1, which can be assumed as the baseline performance level for a set of users having a given set of attributes. The performance level can be expressed in a variety of ways. In some implementations, the performance level at any given time represents an action rate for users, e.g., specifying a portion of users that will perform the specified target action, or how often users perform the specified target action. In some implementations, the performance level can be expressed as a likelihood that users will perform the specified target action. In some situations, the performance level is normalized to a bounded range of values (e.g., 0-1, 0-10, 0-100, etc.).

At time t1, a content exposure ("Exposure A" 210) occurs, which causes an immediate rise in the performance level that is caused by the content exposure. Specifically, the performance level changes from PL1 to PL2 at the time of Exposure A. This change in the performance level indicates that, as a result of Exposure A 210, the rate of users performing the specified target action changes from PL1 to PL2. For purposes of example, assume that exposure A 210 represents a user being exposed to search results for a particular type of shoe. In this example, the modeling apparatus 130 of FIG. 1 indicates that the exposure to the search results causes an increase in the performance of the target action (e.g., acquisition of the particular type of shoes).

After the initial change in the performance level at t1, the effect of Exposure A 210 on the performance level begins to decay and returns back to PL1, as illustrated by the curve that is located between t1 and t2 in the graph 200. This decay is representative of the fact that as time passes, the contribution of a particular content exposure on the user subsequently performing the target action tends to decrease. The rate of decay for each particular type of content exposure can be determined based on the data collected by the model apparatus 130, as discussed in more detail below.

In the example illustrated by FIG. 2, at time t2, the performance level has returned to PL1, which is the baseline performance level, indicating that, at t2, Exposure A 210 is no longer considered to be contributing to performance of the target action. At time t2, a second exposure ("Exposure B" 220) occurs, which changes the performance level from PL1 to PL3, thereby indicating that Exposure B causes users to perform the target action at a higher rate relative to the users' baseline rate of performance of the target action (e.g., PL1). After t2, the increased performance level contributed by Exposure B 220 begins to decay according to a decay function that has been determined for the particular type of content exposure. Continuing with the example above, Exposure B 220 could be, for example, exposure of the user to a digital component created by a manufacturer of the particular type of shoe.

At t3, the contribution of Exposure B 220 to the performance level has fallen below PL3 to PL4, but has not fallen all the way back to PL1, thereby indicating that at t3, Exposure B 220 is still considered to be contributing to users' performance of the target action. As such, Exposure B 220 could be attributed credit for performance of the target action at the time t3, as discussed in more detail below. In the present example, another exposure ("Exposure C" 230) occurs, which again changes the performance level, and specifically increases the performance level to PL5. Exposure C 230 could be an organic exposure or exposure of a digital component. In either situation, the initial level of performance increase caused by Exposure C 230 will be the difference between PL4 and PL5, i.e., the difference between the performance level remaining just prior to Exposure C 230 (e.g., PL4), and the resulting performance level (e.g., PL5) immediately following Exposure C. As shown, PL5 includes contributions from both of Exposure B 220, which had not yet completely decayed, and Exposure C 230. As such, proper attribution of their respective contributions to performance of the target action at t3 would require a determination of the respective incremental levels of performance that combine to provide the performance level PL5. The determination of the incremental levels of performance for content exposures at any given time is discussed in more detail below.

After t3, the performance level again begins to decay (e.g., drop), but this time, the decay is not only due to the decay that has been determined for Exposure C 230, but also the decay of the performance level of Exposure B 220 that remained at t3, as discussed in more detail below. For purposes of example, assume that the target action is performed by a user at t4, which is after t3. In this example, at t4, the performance level has returned to PL4, which is higher than PL1, the baseline performance level. As such, one or more of the content exposures that occurred between t0 and t3 are still considered to be contributing to the performance of the target action 240 at t4. The relative contributions of each content exposure that remains at t4 can be determined, for example, based on the change to the performance level caused by that content exposure, the decay function for that content exposure, and the amount of time that has elapsed from that content exposure and performance of the target action 240, as discussed in more detail below.

The discussion above illustrates how the performance level for a target action can change based on content exposures, and how that changes the total performance level. Mathematical relationships can be used to represent and/or quantify the total performance level at any given time. In some implementations, the performance level for a specified action is represented by:

$$X(t) = X_I(t) + X_S(t)$$

where X(t) represents the total performance level at time t, $X_1(t)$ is the baseline performance level without any exposure to content and $X_s(t)$ is the increase in performance level due to exposure to content. In some implementations, the increase in the performance level due to exposure to content is modelled as $$X_s(t) = a_S X_S(t - \Delta t) + b_S U_S(t)$$

where $a_s$ is the rate of decay of the performance level, $b_s$ is the immediate rise of the performance level and $U_s(t)$ is the exposure to the digital component at time t. The values of $a_s$ and $b_s$ can be determined using historical data, such as data specifying times of content exposures and times at which the target action occurred following those content exposures.

Figure 3:
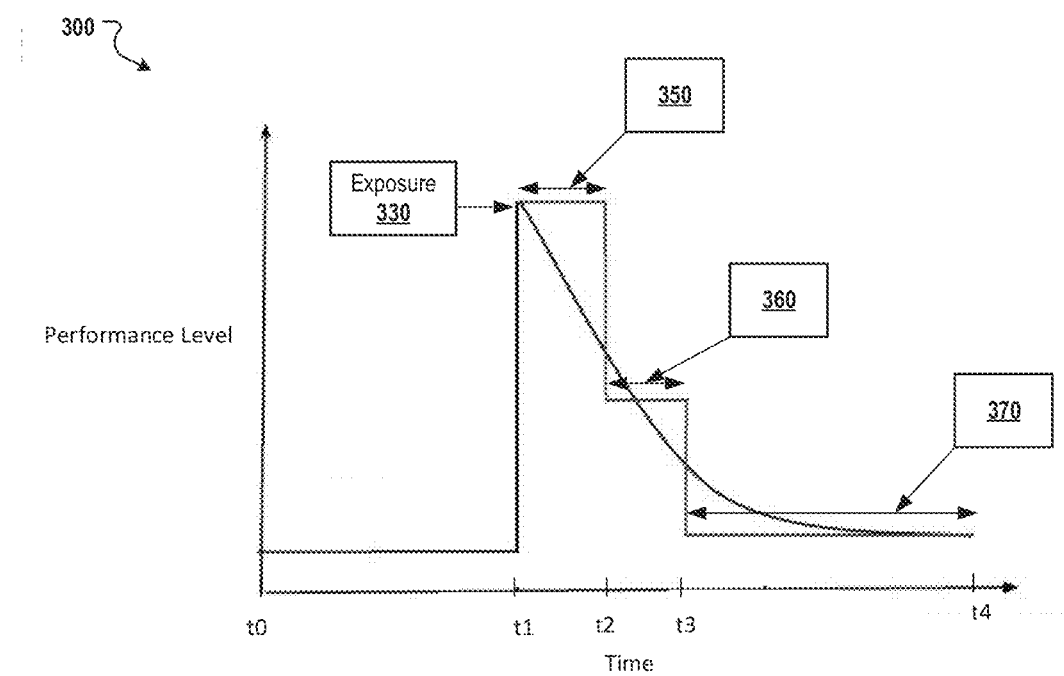
FIG. 3 is a graph of an example decay of the effects of content exposures over time.

FIG. 3 is a graph 300 illustrating an example decay of the effects of a content exposure 330 over time. For example, assume that the user 160 performs an internet search and gets exposed to search results, as represented by the exposure 330, which results in an increase in the performance level. As discussed above, this increased performance level will decay over time, for example, according to a decay function that has been created for search result exposures.

In some implementations, the decay of the performance level is modelled using a piecewise constant function (or another piecewise function, such as a piecewise linear function). For example, the decay in the performance level during time interval 350 is considered the short-term decay, the decay in the performance level during time interval 360 is considered the mid-term decay, and the decay in the performance level during time interval 370 is considered the long-term decay. In other implementations, the piecewise constant function may break the decay process into finer time intervals thereby modeling the decay at a more granular level. In other implementations, other methodologies can be used to estimate the continuous decay function. Using a piecewise constant function reduces the computing resources required to determine the decay, and enables the decay to be computed more quickly.

In such implementations, the time after the content exposure is modelled as a sum of smaller time intervals. For example, to model the decay in performance level between time t1 and t4, the time between t1 and t4 is modelled as sum of time intervals t1-t2, t2-t3 and t3-t4. Each time interval is assumed to have a corresponding decay or more specifically a decay rate. Based on the decay rates of the corresponding time intervals, the performance level after a particular time interval can be computed using the performance level prior to the particular time interval. In some implementations, the decay rates can be set by the digital component provider or any third party interested in generating the baseline model. In some implementations, the decay rates can be determined by other machine learning models based on the users past activity using multiple learnable parameters. In other implementations, the decay rates can be parameters of the baseline model learned during the training process.

It should be noted that the performance level after exposure to a content is determined by the baseline model. In some implementations, the baseline model may determine that the performance level after exposure to a particular content may remain same or increase based on the learned parameters of the baseline model, the particular content, the user and the training data collected for training the baseline model.

Figure 4:
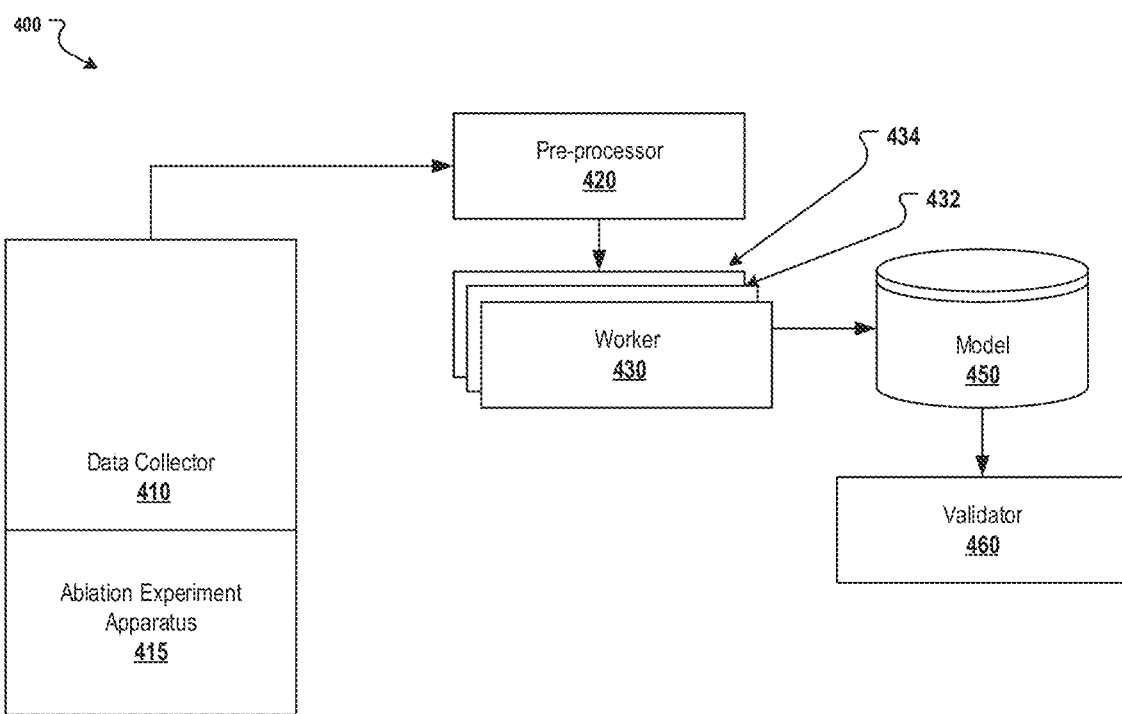
FIG. 4 is a block diagram of an example model apparatus implementing a baseline model.

FIG. 4 is a block diagram of an example system 400 configured to create a model 450 that can be used by the model apparatus 130 to attribute performance of a target action to content exposures that occurred over time. In a simple form, the model can be a baseline model that accepts user attributes as inputs, and outputs a baseline performance level based on the user attributes. The model can be extended to accept inputs related to organic exposures (e.g., types of organic exposures and times of those exposures) that occurred prior to performance of a target action, and output various information, such as the relative contribution of each organic exposure towards the performance of the target action at the time the target action occurred. The model can also be extended to accept inputs related to digital component exposures (e.g., types of digital components and times of the exposures) that occurred prior to performance of a target action, and output information specifying the relative contribution of each digital component to the performance of the target action at the time of the target action. The following discussion refers to creation of a baseline model.

The system 400 includes a data collector 410 that obtains/prepares training samples for training the model 450. The model 450 can be trained, for example, using data collected for a set of users that performed the target action and another set of users that did not perform the target action. For example, assume the target action is a user downloading/installing a native application. In this example, the system can identify prior downloads/installs of the native application, and obtain data specifying content exposures that the users experienced prior to downloading/installing the native application. The system can further obtain data specifying content exposures that the users experienced following which the users did not download/install the native application.

Data collected in such implementations comprise user data representing exposures to all digital components prior to performance of the target action (e.g., application download/install). In some implementations, the model 450 learns the relationships between user attributes and performance levels based on the exposure to various digital components. In other implementations, the model 450 is configured to learn relationships between user attributes and performance levels independent of exposure to specified type of digital components. For example, the model 450 can learn relationships between user attributes and performance levels based on historical exposure data corresponding to users that were not exposed to one or more specified types of digital components (e.g., digital components provided by a particular entity) prior to the users' performance of the target action. This allows the model 450 to determine the baseline performance level for a user based on the user's attributes. In such implementations, the training samples are generated using ablation experiments that allow for the collection of event data, e.g., organic exposure data, representing user exposure to organic content without the users being exposed to third party digital components, as well as enabling the collection of training samples that include third party exposure data representing user exposure to digital components provided by third parties. In other implementations the model 450 can be trained using training samples generated from users that did not get exposed to one or more specified types of digital components without explicitly performing the ablation experiment. For example, the search system 150 and the component distribution 110 can keep track of all search requests from the user 160 and the digital components served to the user 160. Using this data, training samples can be generated that represent users that were not served one or more specified types of digital components thereby having to exposure to the specified digital components.

Figure 5:
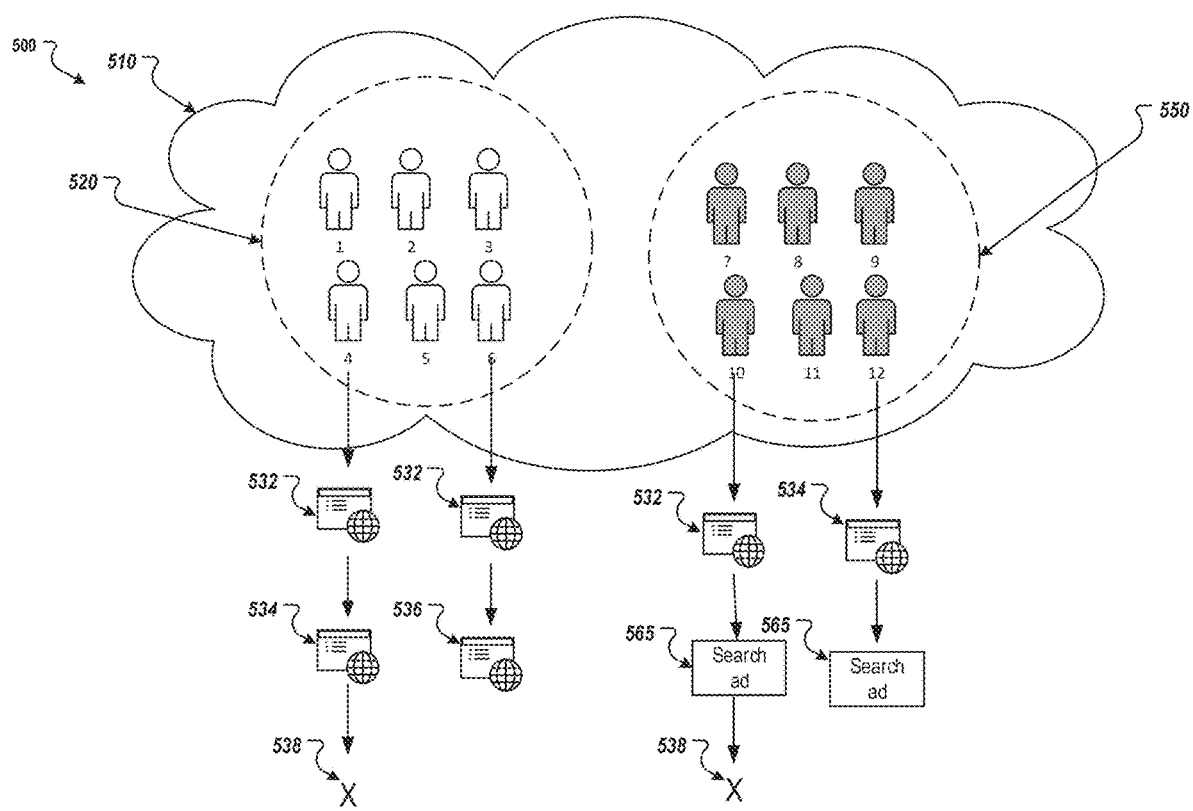
FIG. 5 is a block diagram illustrating an ablation experiment.

FIG. 5 is a block diagram illustrating an ablation experiment, which can be implemented by the ablation experiment apparatus 415 of FIG. 4. The ablation experiment is performed using a set of users 510. In such an implementation, a set of control users 520 are created for a specified period of time during which the set of control users 520 are not served one or more specified types of digital components thereby preventing exposure to digital components that are being evaluated. For example, the set of control users 520 can be marked as being part of a control group for a particular entity that distributes digital components, and in this example, a user's inclusion in the control group can prevent those users from being exposed to digital components distributed by that particular entity, thereby preventing those digital components from effecting subsequent actions performed by the users in the control group 520.

Ablation experiments also define a set of exposed users 550 for the specified period of time. Unlike the set of control users, the set of exposed users 550 are served with the specified type of digital component thereby ensuring that the set of exposed users 550 are exposed to the specified type of digital content (e.g., digital components distributed by the particular entity). For example, the set of users 510 includes the set of control users 520, which include users 1-6. The set of users 510 also includes a set of exposed users 550 which include users 7-12. Each user 1-6 in the group of control user may experience organic exposures, but will not experience third party exposures of a specified type of digital components (e.g., digital components provided by a particular entity and/or related to a particular topic, object, product, or service). Users 7-12 in the set of exposed users 550 gets exposed to the specified type of digital component 565 (e.g., digital components provided by the particular entity).

In some implementations, the users in the set of control users 520 and the set of exposed users 550 are selected randomly from the users in the set 510. In other implementations, this random selection process can be controlled using certain conditions. For example, the baseline model can be trained to determine the performance level for a particular age group of users. In such implementations, the ablation experiment apparatus 415 can select users from the particular age group from the set of users 510 and then randomly assign the selected users to either of the set of control users 520 or the set of exposed users 550.

In some implementation, exposure data (e.g. organic exposure data and/or third party exposure data) are collected for the set of control users and the set of exposed users. For example, the exposure data collected for user 4 in the set of control users 520 can specify that user 4 was exposed to a first website 532 and a second website 534, both of which are organic exposures. According to the collected data, after getting exposed to the first website 532 and the second website 534, user 4 performs the specified target action 538. Continuing with this example, the exposure data can also indicate that, during the specified period, user 6 did not perform the specified target action 538 following exposure to the first website 532 and a third website 536. This exposure data can be used in training samples that include an identifier to the type of exposure (e.g., organic or third party), the time of exposure, duration of exposure, user attributes and whether or not the specified target action was performed within the specified time period.

Similarly from the set of exposed users 550, user 10 performs the specified target action 538 after an initial exposure to the first website 532, and a subsequent third party exposure 565 (e.g., an exposure to a digital component provided by a particular entity and/or related to a particular topic, service, or product). In the present example, user 12 does not perform the specified target action 538 following an initial exposure to the second website 534 and a subsequent third party exposure 565.

Returning to FIG. 4, after collecting the exposure data (e.g., organic exposure data and third party exposure data) as discussed above, the exposure data is processed to generate training samples used to train the model 450. For example, the pre-processor 420 generates each training sample based at least in part on (i) a user descriptor or identifier, (ii) a timestamp of the exposure, (ii) an event descriptor or exposure descriptor, (iv) a timestamp of the next chronological exposure, (v) a count of customers performing specified target actions that occurred in the interval defined by the time of the exposure and the next exposure and (vi) any other appropriate features. In some implementations, multiple processors can be used to train the model 450. For example, multiple workers 430, 432 and 434 are used to train the model 450.

In some implementations, the model 450 is designed using a model wherein the parameters of the model characterize the expected increment to the number of actions for a user on a given time interval. In this document this is referred as intensity rate (2). In such implementations, the model can be defined as follows $$\lambda(i|X) = \lim_{\Delta t \to 0} \frac{E[Y_i(t + \Delta t) - Y_i(t)|X]}{\Delta t} = \lim_{\Delta t \to 0} E[dY_i(t)|X]/\Delta t$$

where $Y_i(t)$ is a counting process that represents the performance of the target action by counting the number of conversions for the user in time t where X is some feature set.

In some implementations, the intensity at time t is modelled as a function of a time dependent feature set and is assumed to be a piecewise constant on various intervals. In such implementations the log of the mean intensity rate of each exposure interval of a user is modelled as $$\log(\lambda_{ij}(t|X_{ij}(t) = x_{ij}(t)) = \log(\lambda_0(t)) + \beta^T \cdot x_{ij}(t) + \eta_i$$

where $t \in [t_j, t_{j+1})$, i is the index for the user, j is the exposure that does not result in user performance of the target action, $\eta_i$ is the user level random effect for the user i and $t_j$ is the start time of the exposure j.

In some implementations, the likelihood contribution for each interval $[t_j, t_{j+1})$ would take the following form $$Pr[Y_i(t_{j+1}) - Y_i(t_j) = dy] = \frac{\left\{\int_{t_j}^{t_{j+1}} \lambda_{ij}(u|X_{ij}(u)du\right\}^{dy}}{dy!} e^{-\int_{t_j}^{t_{j+1}} \lambda_{ij}(u|X_{ij}(u)du}$$

$$= \frac{(\lambda_{ij}\Delta t_{ij})^{dy}}{dy!} e^{-\lambda_{ij}\Delta t_{ij}}$$

where $\Delta t_{ij} = t_{j+1} - t_j$ and $\lambda_{ij}$ is the piecewise increment to the number of specified target actions for a user on a given time interval. In some implementations, the baseline increment to the number of specified target actions $\lambda_0(t)$ can be constant. In other implementations, $\lambda_0(t)$ is estimated using a piecewise step function. In such implementations, the model above can be estimated using a Poisson regression with an offset given by the log length of time in each interval.

In some implementations, the model 450 is validated using simulation results, real word data and cross validation. For example, the validator 460 can use known values of the learnable parameters of the model 450 to simulate user exposure to digital components and performance of the specified target action. Those known parameters are compared to the learned parameters to measure the goodness of the training process. In another implementation, the model prediction can be compared to real word data representing exposures and the specified target action for model accuracy.

In some implementations, parties like a provider of a particular digital component may be interested in the effectiveness of the particular digital component. For example, the provider may want to measure the impact of a particular digital component exposure on the user's subsequent performance of the target action. In such implementations, the difference between the contribution of a digital component exposure to the total performance level determined for the user and the determined decay of the digital component exposure corresponds to the effectiveness (e.g., incremental effect) of exposure to the particular digital component in causing performance of the target action.

Figure 6A:
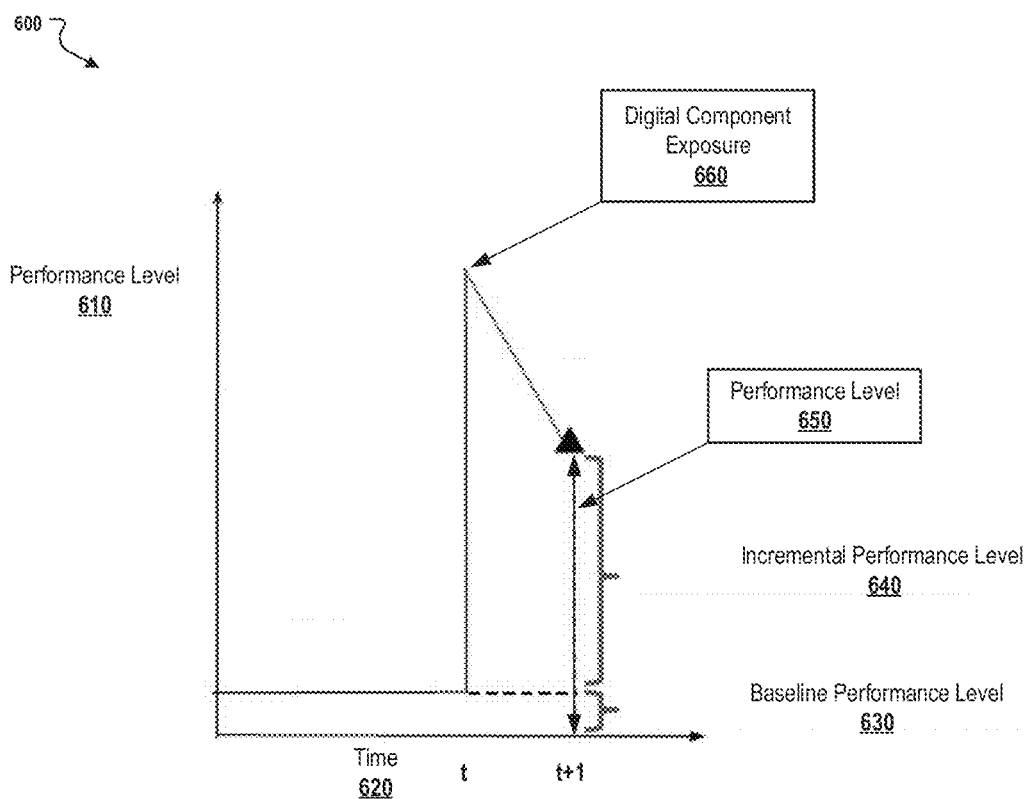
FIG. 6A is a graph illustrating the incremental effect of exposure to a single digital component.

FIG. 6A is a graph 600 illustrating the incremental effect of exposure to a single digital component on performance of the target action. In this example, assume that the user experiences a digital component exposure 660 at time t, and then performs the specified target action at time t+1. As illustrated, prior to time t, the user's performance level was initially at the baseline performance level 630 determined based on the user's attributes. At time t, the user is experiences the digital component exposure 660, which results in a rise in the performance level. Between the time t and the time t+1 at which the user performs the specified target action, the performance level attributable to the digital component exposure 660 decays according to a decay function corresponding to the particular type of digital component to which the user was exposed at time t. As seen in the graph 600, at the time t+1, the remaining performance level 650 includes a contribution from (e.g., is a sum of) the baseline performance level 630 and the incremental performance level 640 attributable to the digital component exposure at the time t. The incremental performance level 640 generally represents the influence that the digital component exposure 660 had on the performance of the specified target action at the time t+1, which can be considered a measure of the effectiveness of the digital component exposure 660 in causing the user to perform the specified target action.

As mentioned before, the performance of the specified target action can be attributed to multiple different exposures (e.g., organic exposures and/or third party exposures), as well as the baseline performance level determined for the users. As discussed above, the baseline performance level represents the inclination of the user towards performing the specified target action in the absence of exposure to digital components and/or organic exposures. Each component exposures can also incrementally contribute to the performance level that exists at the time of the target action. As such, the performance level at the time the target action is performed can be attributable to the baseline performance level determined for the user, and the incremental amount of performance level contribution remaining for each exposure at the time of the target action. In situations where the user experiences multiple different content exposures, each exposure can be attributed an incremental amount of the performance level based on the difference between the initial performance level contribution provided by the exposure and the amount of decay that occurs between the time of that exposure and the time at which the target action occurs.

Figure 6B:
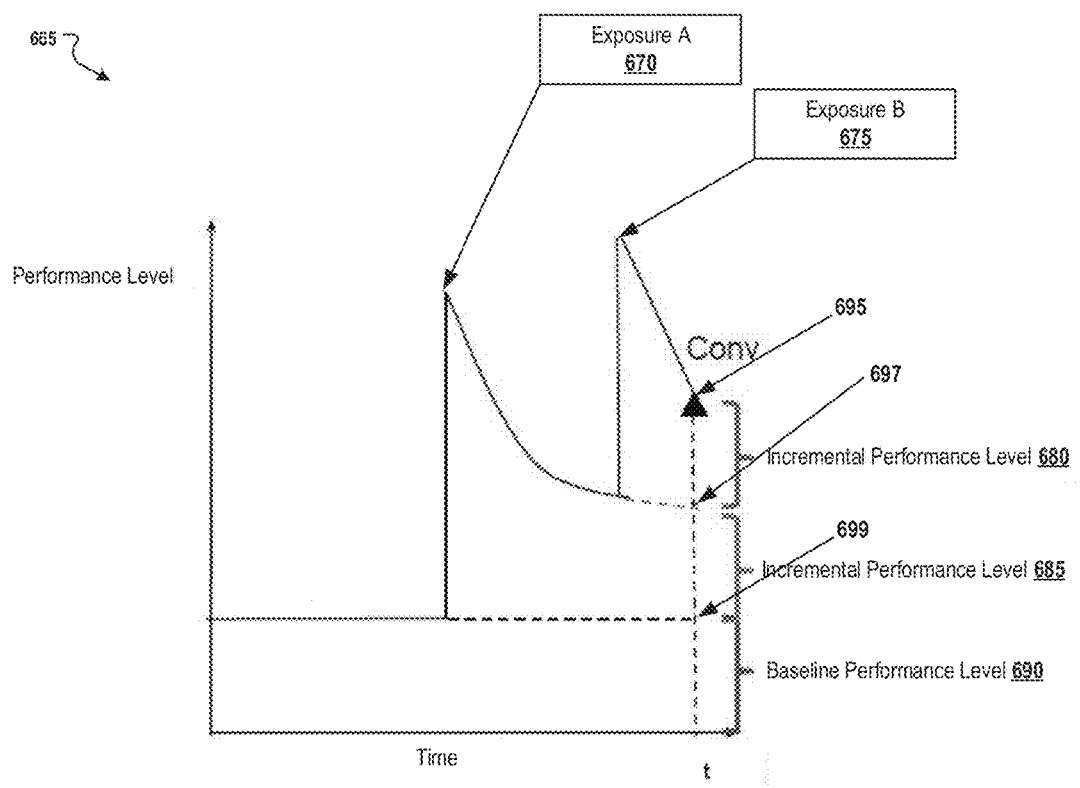
FIG. 6B is a graph illustrating the incremental effects of exposures to multiple digital component.

FIG. 6B is a graph 665 illustrating the incremental effects of exposures to multiple digital component. Initially, the performance level is at the baseline performance level 690 that is determined using the attributes of the user. When the user experiences exposure A 670, the performance level rises and then starts to decay with time. The user then experiences exposure B 675, causing the performance level to rise and then again decay with time.

At time t, which follows exposure B 675, the user performs the target action (e.g., a conversion). In this example, the performance level decays to the final performance level 695. In this example, the final performance level 695 includes incremental contributions from both of exposure 670 and exposure 675. For purposes of illustration as to the remaining incremental effects of these two exposures, assume that exposure B 675 did not occur, but the target action still occurred at time t. In this example, the performance level remaining at time t would have decayed to 697 in the absence of exposure B 675. In this case, the incremental performance 680 attributed to exposure B 675 is the difference between performance levels 695 and 697, such that exposure B 675 can be attributed a portion of the credit for the performance of the target action based on the difference between the performance levels 695 and 697.

Continuing with this example, the incremental contribution 685 of exposure A 670 at time t can be illustrated by considering the difference between the baseline performance level 690 and the performance level 697 that would have existed if exposure A 670 occurred, but exposure B 675 had not occurred. For example, the incremental performance level 685, and therefore portion of credit for performance of the target action, attributable to exposure A 670 is the portion of the performance level at time t that exceeds the baseline performance level 690 that exists for this user independent of any exposures to digital components (or other content).

In some implementations, attributing incremental performance to content exposures can be based on the intensity rate. In such implementations, incremental performance is based on the difference between the intensity rates before and after exposures. In such implementations, the intensity at the time when the user performs the specified target action can be represented as $$\lambda_\$ = \prod_{k=0}^{K} \lambda_{S,k,i_k} \lambda_{L,k,i_k}$$

Where \$ refers to performing the specified target action, S and L is the short and long term constants, k is the exposure type and $i_k$ is the counter of the exposure type. In such implementations, $\lambda_s$ can be represented as $$\lambda_\$ = \lambda_0 \times \lambda_1 \times \cdots \times j \times \cdots \times \lambda_n$$

Where j=1, 2 ..., n represents the $j^{th}$ exposure with the total of n exposures. The incremental performance can then be calculated in a sequentially using $$c_j = \left(\prod_{h=0}^{j} \lambda_h - \prod_{h=0}^{j-1} \lambda_h\right) / \lambda_\$ = (\lambda_j - 1) / \prod_{h=j}^{n} \lambda_h$$

Where j=0 and $$c_j = \lambda_0 / \lambda_\$ = 1 / \prod_{h=1}^{n} \lambda_h$$

In some implementations, one or more entities may be interested in knowing which digital components to serve the user to affect the user's performance level for a specified target action. In such implementations, the model that represents the relationships between content exposures and performance levels for a specified action can be used to determine which digital component to serve to the user to increase a likelihood of the user performing the target action. For example, the user 160 performs an online search using user device 106 regarding a particular product. The search system 150 while providing search results to the user 160 via user device 106, also provides digital components that contain information about the particular products. In some implementations, the model apparatus 130 uses the model 450 to determine which digital components to be shown with the search results so as to have increase the performance level related to acquiring the product. In some implementations, the model apparatus 130 may determine based on the user attributes that certain digital components not be served to the user 160 upon concluding that the digital components may not result in a significant increase in the performance level upon exposure.

Figure 7:
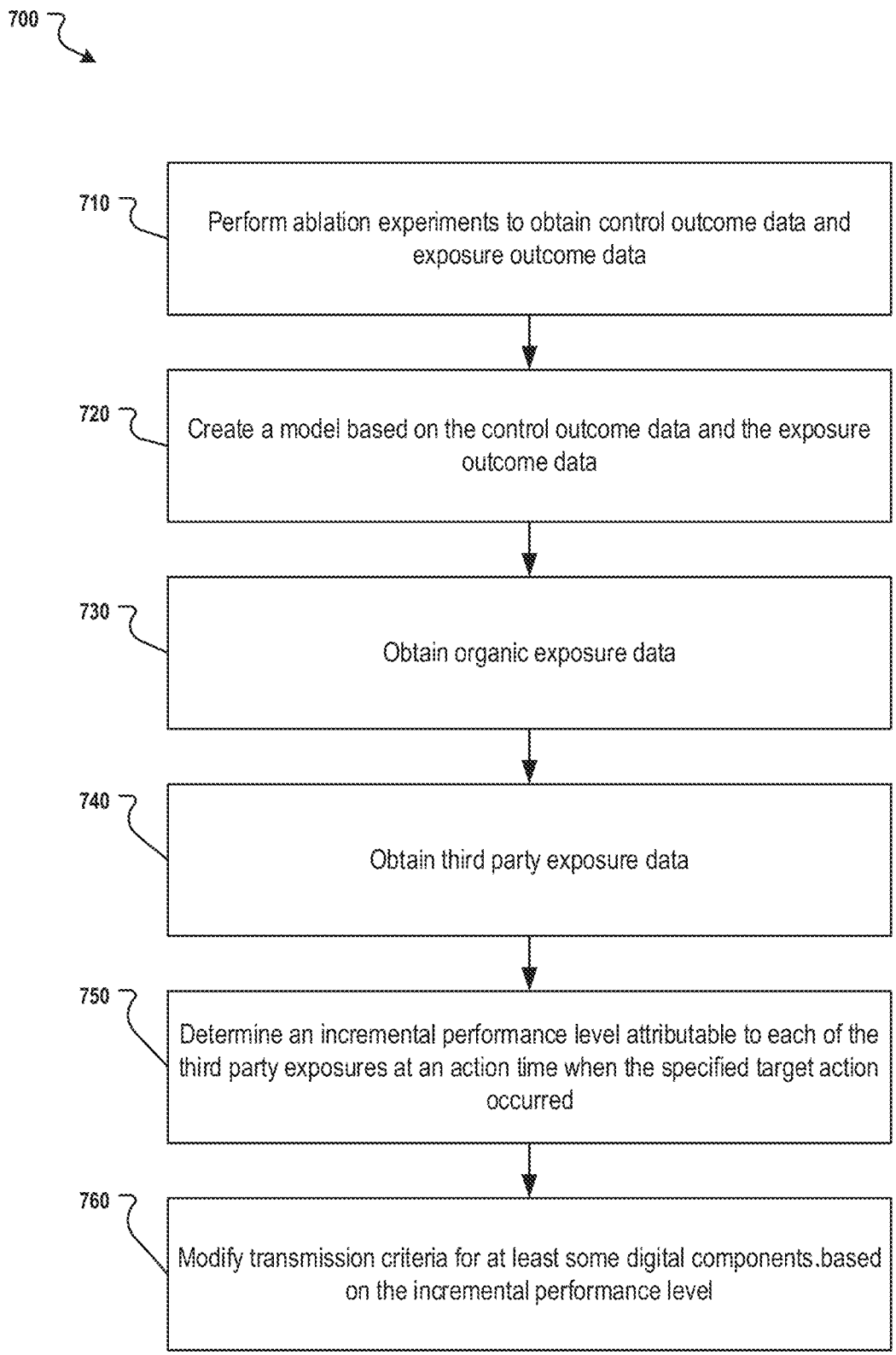
FIG. 7 is a flowchart of an example process of modifying transmission criteria for digital components based on the incremental effects of the digital components.

FIG. 7 is a flow chart of an example process of modifying transmission criteria for digital components based on the incremental effects of the digital components. Operations of the process 700 can be performed by one or more data processing apparatus or computing devices, such as the model apparatus 130 discussed above. Operations of the process 700 can also be implemented as instructions stored on a non-transitory computer readable medium. Execution of the instructions can cause one or more data processing apparatus, or computing devices, to perform operations of the process 700. Operations of the process 700 can also be implemented by a system that includes one or more data processing apparatus, or computing devices, and a memory device that stores instructions that cause the one or more data processing apparatus or computing devices to perform operations of the process 700. As discussed in more detail below, the process 700 builds and utilizes a model that can provide the baseline performance level for a user and the relative contribution of each content exposure to performance of a specified target action by the user.

Ablation experiments are performed to obtain control outcome data and exposure outcome data (710). The ablation experiments are performed by segmenting users into a set of control users and a set of exposure users. The set of control users are those users that will not be exposed to a particular type of digital component that is being analyzed. For example, assume that data is being gathered to determine the relative impact of exposures to digital components (e.g., advertisements) distributed by a maker of a particular camera. In this example, the ablation experiments could utilize a flag designating each of user in the set of control users as ineligible to receive digital components for the particular camera that are distributed by the maker of the particular camera. In some situations, the particular type of digital component can be defined based on a media type (or other appropriate characteristic). For example, the set of control users could be prevented from seeing video digital components provided by the maker of the digital camera, but may be eligible for exposure to non-video digital components.

The ablation experiments enable systems to obtain a set of control outcomes for a set of control users that are not exposed to a particular set of digital components. In some implementations, the control outcomes specify, for each particular control user in the set of control users, whether the particular control user performed the specified action. For example, historical online activity data for each control user in the set of control users can be evaluated to determine whether that control user performed the specified target action, activities performed by the control user (e.g., search queries submitted), and content exposures experienced by the control user. This information can be processed and/or used as training examples that are used to create a model that can determine the incremental contribution of each content exposure over a baseline level of performance for users. More specifically, the control outcomes and corresponding data collected about the control users can be used to learn a baseline performance level for users having specific sets of characteristics and/or the effects of organic exposures on performance levels independent of any effects of the specified types of digital components on the control users actions, as the control users will not be exposed to the particular types of digital components.

The ablation experiments can also enable a system to collect exposure outcomes for a set of exposed users that are not included in the set of control users. In some implementations, the exposure outcomes specify, for each exposure user in the set of exposure users, whether the exposure user performed the specified action. This information can be processed and/or used as training examples that are used to create a model that can determine the incremental contribution of each third party content exposure over a baseline level of performance for users.

A model is created based on the control outcome data and the exposure outcome data (720). The model can be created (e.g., trained) based on the data collected during the ablation experiments, and using mathematical relationships discussed throughout this document. For example, the model can be created using a machine learning framework that uses the attributes of the users, the control outcomes for each particular control user, and the exposure outcome for each of the exposure users. In some implementations, the model represents relationships between user attributes, content exposures, and performance levels for a specified target action. The model can be generated to accept as input, a set of user attributes for a particular user, a set of content exposures (e.g., organic exposures and/or third party exposures), times at which the content exposures occurred, and a time at which the particular user performed the specified target action. The model can be generated to output information including, a baseline performance level for the particular user based, for example, on the user attributes, an incremental contributions of content exposures that the particular user experienced prior to performance of the specified target action.

Organic exposure data is obtained for a particular user that performed the specified target action (730). In some implementations, the organic exposure data specifies one or more organic exposures experienced by the particular user over a specified time period leading up to (i.e., prior to) performance of the specified target action by the particular user. The organic exposures are neither exposures to the specified type of digital component (e.g., are not third party exposures of a digital component provided by third parties), nor performance of the specified target action. One example of an organic exposures is exposure to search results generated by a search engine and presented to the particular user in response to submission of a search query by the particular user. Another example organic exposure is exposure to content from web pages that the user navigates to independent of exposure to, or interaction with, a third party digital component. For example, the particular user may manually enter a web page address into a browser to navigate to that web page. This would be considered an organic exposure to content.

Third party exposure data is obtained for the particular user that performed the specified target action (740). In some implementations, the third party exposure data specifies third party exposures of the specified type of digital component to the particular over the specified time period leading up to (i.e., prior to) the time at which the particular user performed the specified target action. The third party exposure data can include, for each of the third party exposures, an exposure time specifying when the third party exposure occurred. Examples of third party exposures include presentations of content provided by a third party in any of search results pages, web pages provided by a publisher who differs from the third party, or native applications provided by an app developer who differs from the publisher.

An incremental performance level attributable to each of the third party exposures is determined using the model (750). For example, the organic exposures data and the third party exposure data can be input to the model, and the model can output incremental performance levels that are attributed to each of the third party exposures. The incremental performance level can be determined as of the action time when the specified target action was performed by the particular user. The incremental performance level can be determined as a residual amount of performance level contribution from a third party exposure that remains at the action time. For example, for each third party exposure, a difference between the exposure time of that third party exposure and the action time when the specified target action occurred can be determined. This difference between the exposure time and the action time can be input to a decay function for the third party exposure, which will specify an amount of the performance level contribution provided by the third party exposure has decayed between the exposure time and the action time.

The amount of the contribution that remains at the action time (e.g., by subtracting the amount of decay experienced between the exposure time and the action time from the initial performance level contribution provided by the third party exposure) is considered the residual amount of performance level contribution from the third party exposure that remains at the action time, which can be attributed to the third party exposure. A different decay function can be determined for each different type of third party exposure based on the data obtained during the ablation experiments, and each decay function will specify a rate of decay of the performance level contribution as a function of time.

The model uses both of the organic exposure data and the third party exposure data so that the contributions of the organic exposures can be removed from the total performance level that remains at the action time. Similarly, the model accounts for (e.g., removes) the contribution of the baseline performance level from the total performance level remaining at the action time, thereby isolating the contributions of the third party exposures.

Transmission criteria for at least some digital components are modified based on the incremental performance level attributed to exposures of the digital components (760). In some situations, the transmission criteria for a digital component can be modified to increase the frequency with which the digital component is transmitted to users when the incremental performance level attributed to exposures of the digital components is high (e.g., higher than other available digital components). In some situations, the transmission criteria for a digital component can be modified to decrease the frequency with which the digital component is transmitted to users when the incremental performance level attributed to exposures of the digital components is low (e.g., lower than other available digital components). In some implementations, the transmission criteria for a particular digital component can be adjusted in proportion to a magnitude of the incremental performance level attributed to the third party exposures of the particular digital component. In some implementations, a particular transmission criterion (e.g., a keyword) can be disabled when the incremental performance level attributed to third party exposures resulting from transmission of the digital component based on the particular transmission criterion is less than a specified magnitude. For example, assume that the keyword "boot" is used to distribute a digital component for a particular third party content provider, and that the incremental performance level attributed to third party exposures triggered by the keyword boot are less than a specified minimum acceptable level. In this example, the keyword boot can be disabled, such that it will not trigger distribution of the digital component for the third party content provider.

Figure 8:
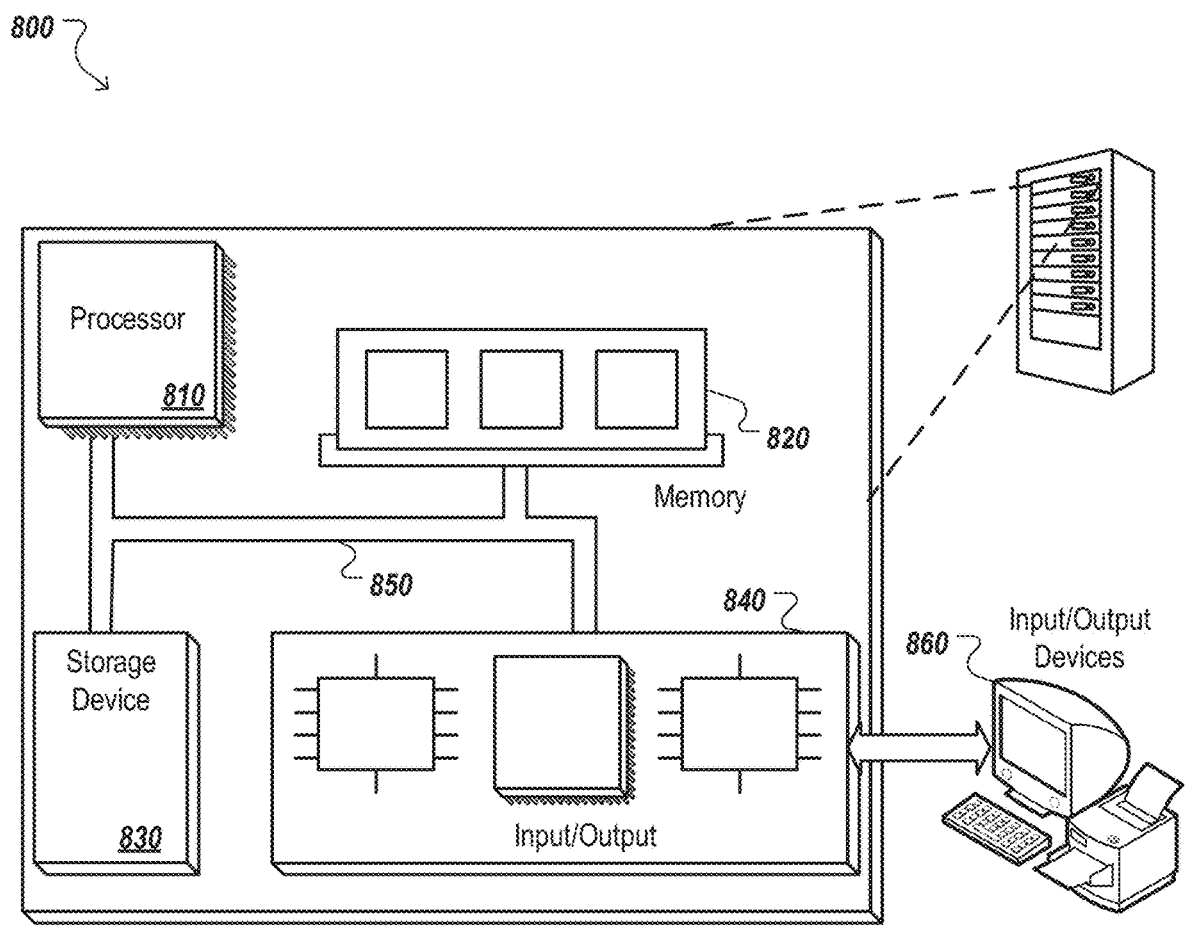
FIG. 8 is a block diagram of an example computer system that can be used to perform operations described herein.

FIG. 8 is block diagram of an example computer system 800 that can be used to perform operations described above. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, a storage device that is shared over a network by multiple computing devices (e.g., a cloud storage device), or some other large capacity storage device.

The input/output device 840 provides input/output operations for the system 800. In one implementation, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 370. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    creating, by one or more computing devices, a model that represents relationships between user attributes, content exposures, and performance levels for a specified target action;
    obtaining content exposure data specifying content exposures experienced by a particular user;

determining, using the model and the content exposure data, an incremental performance levels attributable to each of the content exposures at an action time when the specified target action was performed by the particular user; and modifying, by the one or more computing devices, transmission criteria for at least some digital components to which the particular user was exposed based on the incremental performance levels.

2. The method of claim 1, further comprising:

performing ablation experiments to obtain a set of control outcomes for a set of control users that are not exposed to a particular set of digital components, the control outcomes specifying, for each particular control user in the set of control users, whether the particular control user performed the specified action;

collecting exposure outcomes for a set of exposed users that are not included in the set of control users, the exposure outcomes specifying, for each exposure user in the set of exposure users, whether the exposure user performed the specified action.

3. The method of claim 2, wherein:

creating the model comprises creating, using a machine learning framework, the model using user attributes, the control outcome for each particular control user, and the exposure outcome for each exposure user.

4. The method of claim 1, wherein:

the content exposures include third party exposures; and determining the incremental performance level comprises:

for each third party exposure among the content exposures:

determining a difference between the exposure time of the third party exposure and the action time when the specified target action occurred;

determining, based on the difference between the exposure time of the third party exposure and the action time when the specified target action occurred, a residual amount of performance level contribution from the third party exposure that remains at the action time; and attributing the residual amount of the performance level to the third party exposure.

5. The method of claim 4, further comprising:

determining, for each different type of third party exposure, a decay function specifying a rate of decay of the performance level contribution remaining as a function of time; and determining for each third party exposure, the residual amount of performance level contribution from the third party exposure that remains at the action time based on the decay function and the difference between the exposure time of the third party exposure and the action time.

6. The method of claim 4, wherein modifying transmission criteria for at least some digital components comprises adjusting the transmission criteria for a particular digital component in proportion to a magnitude of the incremental performance level attributed to third party exposures of the particular digital component.

7. The method of claim 6, wherein adjusting the transmission criteria includes disabling a particular transmission criterion having less than a specified magnitude of the incremental performance level attributed to the third party exposures of the particular transmission criterion.

8. A system, comprising:

a data store storing one or more evaluation rules; and one or more data processors configured to interact with the one or more evaluation rules, and perform operations comprising:

creating, by one or more computing devices, a model that represents relationships between user attributes, content exposures, and performance levels for a specified target action;

obtaining content exposure data specifying content exposures experienced by a particular user;

determining, using the model and the content exposure data, an incremental performance levels attributable to each of the content exposures at an action time when the specified target action was performed by the particular user; and modifying, by the one or more computing devices, transmission criteria for at least some digital components to which the particular user was exposed based on the incremental performance levels.

9. The system of claim 8, wherein the one or more data processors are configured to perform operations comprising:

performing ablation experiments to obtain a set of control outcomes for a set of control users that are not exposed to a particular set of digital components, the control outcomes specifying, for each particular control user in the set of control users, whether the particular control user performed the specified action;

collecting exposure outcomes for a set of exposed users that are not included in the set of control users, the exposure outcomes specifying, for each exposure user in the set of exposure users, whether the exposure user performed the specified action.

10. The system of claim 9, wherein:

creating the model comprises creating, using a machine learning framework, the model using user attributes, the control outcome for each particular control user, and the exposure outcome for each exposure user.

11. The system of claim 8, wherein;

the content exposures include third party exposures; and determining the incremental performance level comprises:

for each third party exposure among the content exposures:

determining a difference between the exposure time of the third party exposure and the action time when the specified target action occurred;

determining, based on the difference between the exposure time of the third party exposure and the action time when the specified target action occurred, a residual amount of performance level contribution from the third party exposure that remains at the action time; and attributing the residual amount of the performance level to the third party exposure.

12. The system of claim 11, wherein the one or more data processors are configured to perform operations comprising:

determining, for each different type of third party exposure, a decay function specifying a rate of decay of the performance level contribution remaining as a function of time; and determining for each third party exposure, the residual amount of performance level contribution from the third party exposure that remains at the action time based on the decay function and the difference between the exposure time of the third party exposure and the action time.

13. The system of claim 11, wherein modifying transmission criteria for at least some digital components comprises adjusting the transmission criteria for a particular digital component in proportion to a magnitude of the incremental performance level attributed to third party exposures of the particular digital component.

14. The system of claim 13, wherein adjusting the transmission criteria includes disabling a particular transmission criterion having less than a specified magnitude of the incremental performance level attributed to the third party exposures of the particular transmission criterion.

15. A non-transitory computer readable medium storing instructions that, when executed by one or more data processing apparatus, cause the one or more data processing apparatus to perform operations comprising:
   creating, by one or more computing devices, a model that represents relationships between user attributes, content exposures, and performance levels for a specified target action;
   obtaining content exposure data specifying content exposures experienced by a particular user;
   determining, using the model and the content exposure data, an incremental performance levels attributable to each of the content exposures at an action time when the specified target action was performed by the particular user; and
   modifying, by the one or more computing devices, transmission criteria for at least some digital components to which the particular user was exposed based on the incremental performance levels.

16. The non-transitory computer readable medium of claim 15, wherein the instructions cause the one or more data processing apparatus to perform operations comprising:
   performing ablation experiments to obtain a set of control outcomes for a set of control users that are not exposed to a particular set of digital components, the control outcomes specifying, for each particular control user in the set of control users, whether the particular control user performed the specified action;
   collecting exposure outcomes for a set of exposed users that are not included in the set of control users, the exposure outcomes specifying, for each exposure user in the set of exposure users, whether the exposure user performed the specified action.

17. The non-transitory computer readable medium of claim 16, wherein:
   creating the model comprises creating, using a machine learning framework, the model using user attributes, the control outcome for each particular control user, and the exposure outcome for each exposure user.

18. The non-transitory computer readable medium of claim 15, wherein:
   the content exposures include third party exposures; and
   determining the incremental performance level comprises:
      for each third party exposure among the content exposures:
         determining a difference between the exposure time of the third party exposure and the action time when the specified target action occurred;
         determining, based on the difference between the exposure time of the third party exposure and the action time when the specified target action occurred, a residual amount of performance level contribution from the third party exposure that remains at the action time; and
         attributing the residual amount of the performance level to the third party exposure.

19. The non-transitory computer readable medium of claim 18, wherein the instructions cause the one or more data processing apparatus to perform operations comprising:
   determining, for each different type of third party exposure, a decay function specifying a rate of decay of the performance level contribution remaining as a function of time; and
   determining for each third party exposure, the residual amount of performance level contribution from the third party exposure that remains at the action time based on the decay function and the difference between the exposure time of the third party exposure and the action time.

20. The non-transitory computer readable medium of claim 18, wherein modifying transmission criteria for at least some digital components comprises adjusting the transmission criteria for a particular digital component in proportion to a magnitude of the incremental performance level attributed to third party exposures of the particular digital component.

* * * * *